No. 666,979. Patented Jan. 29, 1901.
W. H. SARGENT.
WEIGHING SCALE.
(Application filed May 3, 1900.)

(No Model.) 3 Sheets—Sheet 1.

WITNESSES:
Frank O. French
Charles E. Abbott

INVENTOR
Willis Herbert Sargent,
BY Sturtevant & Freeley
ATTORNEYS

No. 666,979. Patented Jan. 29, 1901.
W. H. SARGENT.
WEIGHING SCALE.
(Application filed May 3, 1900.)
(No Model.) 3 Sheets—Sheet 2.

WITNESSES: INVENTOR
Frank O. French Willis Herbert Sargent
Charles C. Abbott BY
Sturtevant & Hedley
ATTORNEYS No. 666,979. Patented Jan. 29, 1901.
W. H. SARGENT.
WEIGHING SCALE.
(Application filed May 3, 1900.)
(No Model.) 3 Sheets—Sheet 3.
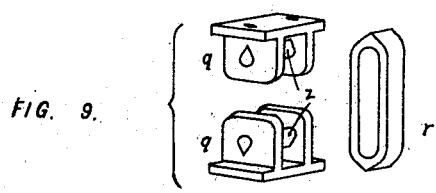
FIG. 9.
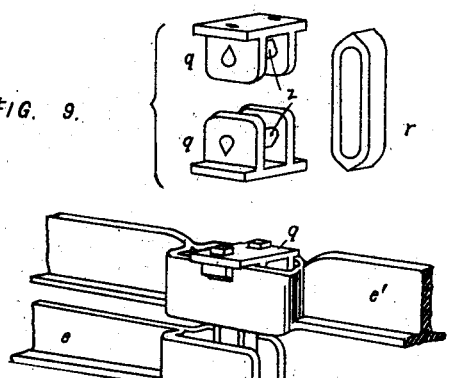
FIG. 10.
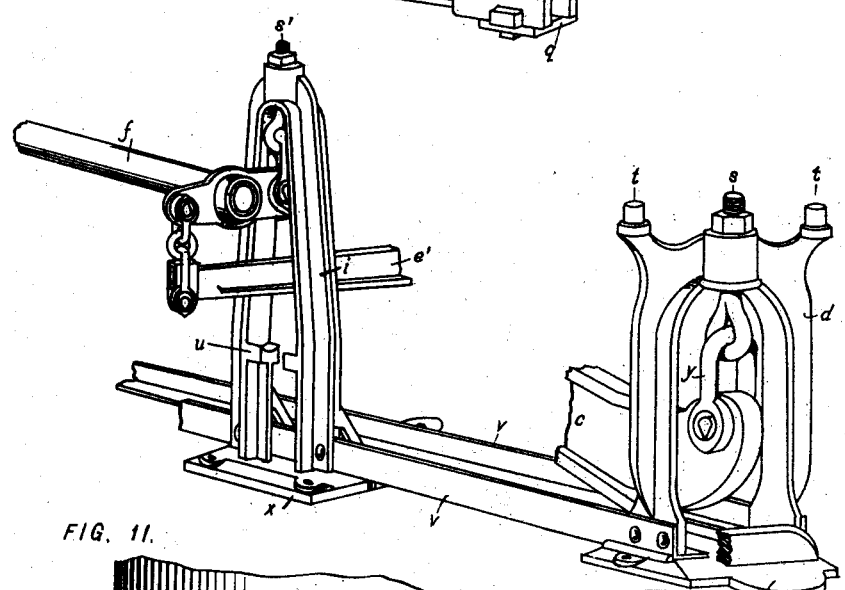
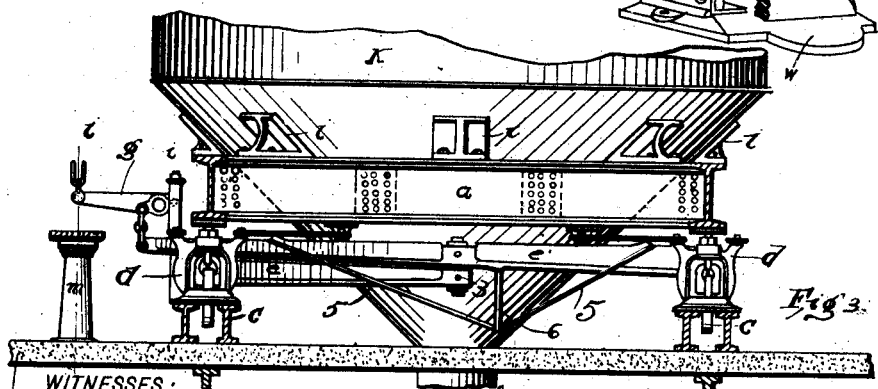
FIG. 11.
WITNESSES:
Frank O. French
Charles E. Abbott
INVENTOR
Willis Herbert Sargent
by Sturtevant & Medley
ATTORNEYS

United States Patent Office.

WILLIS H. SARGENT, OF ST. JOHNSBURY, VERMONT, ASSIGNOR TO THE E. & T. FAIRBANKS & COMPANY, OF SAME PLACE.

WEIGHING-SCALE.

SPECIFICATION forming part of Letters Patent No. 666,979, dated January 29, 1901.

Application filed May 3, 1900. Serial No. 15,364. (No model.)

*To all whom it may concern:*

Be it known that I, WILLIS H. SARGENT, a citizen of the United States, residing at St. Johnsbury, in the county of Caledonia, State of Vermont, have invented certain new and useful Improvements in Weighing-Scales, of which the following is a description, reference being had to the accompanying drawings and to the letters and figures of reference marked thereon.

My invention relates to an improvement in weighing-scales, and particularly of the type known as "hopper-scales," for use in breweries, elevators, and the like, the object being to provide such a construction of scale that a large free opening may be left in the center of the scale, through which the hopper may protrude and through which various pipes may lead off from the hopper or tank without interfering with the scale itself, this capability of use of a large hopper arising from the arrangement of the various points of support and weighing-levers, whereby the load is distributed in a manner to permit the use of such a large hopper.

The invention therefore consists in the various matters hereinafter described, and referred to in the appended claims, whereby the results aimed at are accomplished in an effective manner.

The invention is illustrated in the accompanying drawings, in which—

Figure 1:
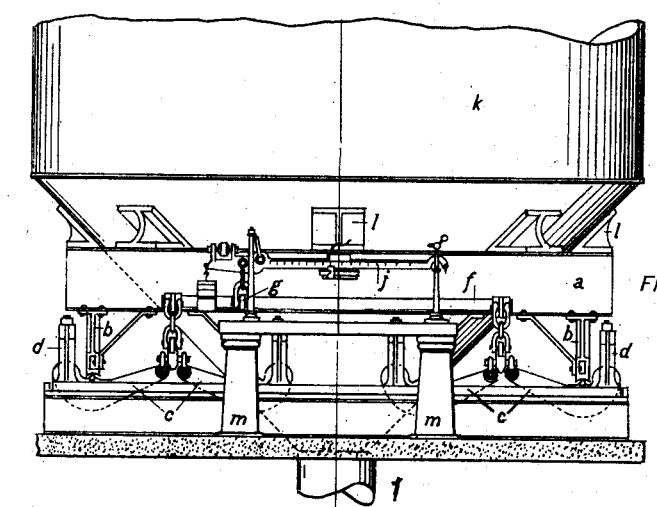
Figure 2:
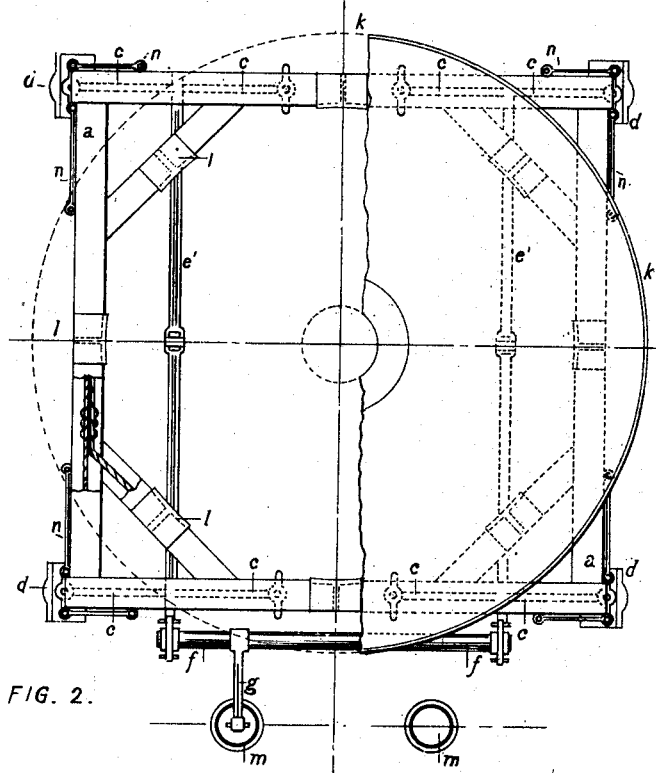
Figure 4:
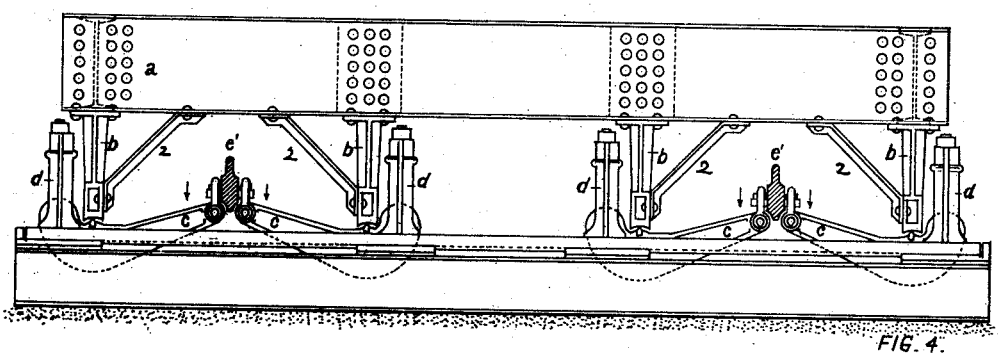
Figure 5:
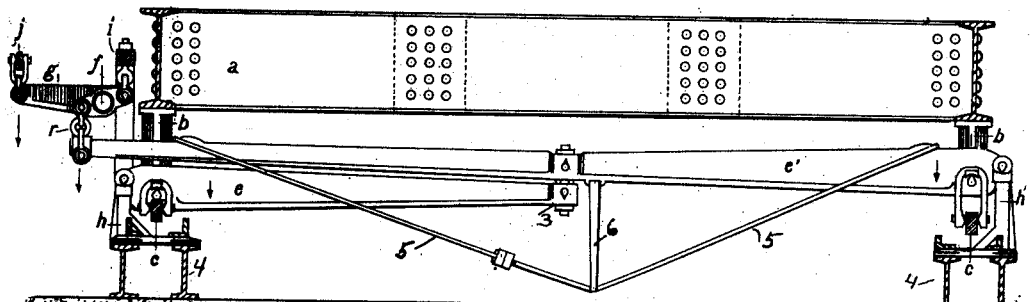
Figures 6, 7, 8:
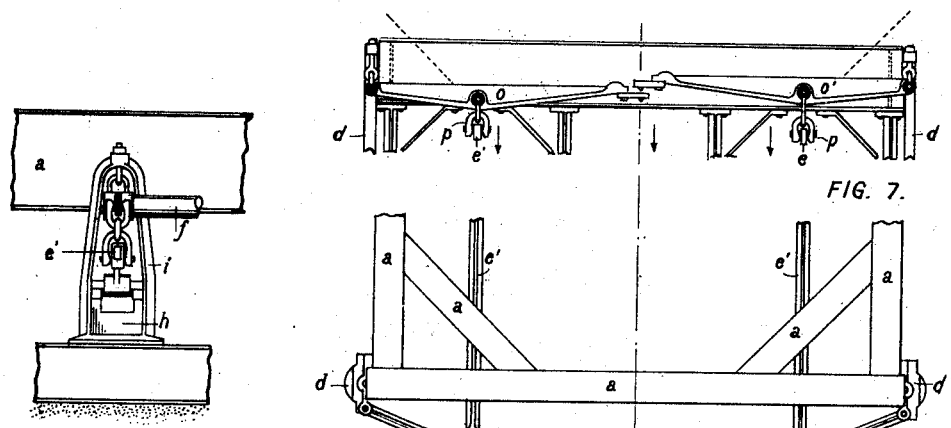

Figure 1 is a front elevation of a complete scale embodying my invention. Fig. 2 is a plan view showing the general construction, including the connection with the pipe-lever. Fig. 3 is a side elevation of the scale complete. Fig. 4 is a front elevation with weighing-beam and pillars removed to show levers and bearings. Fig. 5 is a side elevation with the yokes removed, showing the manner of connecting the levers together. Fig. 6 is a detail view of the yokes for the pipe-levers. Fig. 7 is a front elevation of an alternative device which may be used in place of the pipe-lever. Fig. 8 is a plan view of the same. Fig. 9 represents in detached view the parts connecting the extension-levers $e\ e'$. Fig. 10 is a perspective view showing the parts connected. Fig. 11 is a perspective view illustrating the construction of the yokes $i$ and $d$.

In the drawings, in which similar letters and figures of reference indicate similar parts throughout, $a$ represents the platform of the scale, which may be of any suitable construction, upon which are secured lugs, as $l$, preferably inclined downwardly, upon which lugs is bolted or rests in any suitable manner the hopper $k$, having the conical-shaped bottom part terminating in the exit-pipe, as shown at 1.

Attached to the under side of the platform $a$ are upright scale-bearings $b$, of usual construction, braced by angle-irons 2 and resting on knife-edge bearings on the main levers $c$, of which four are shown, two at each corner of the scale, one end of said levers $c$ being supported on the yokes $d$. (Shown most clearly in Fig. 3.) At one side of the scale the sets of levers $c$ are so arranged that the adjacent forward ends of the two levers making up each set are hung by loops and knife-edge bearings from the first extension-levers $e$, two of these extension-levers being shown, which extend half-way across the area of the scale and at their inner ends are hung, as at 3, from the second extension-levers $e'$, which adjacent their inner ends support in the manner just described the forward ends of the remaining levers $c$. The inner ends of the levers $e\ e'$ are supported by knife-edge bearings on the standards $h\ h'$, respectively, which are suitably supported on channel-iron structural work, as at 4, the parts being braced by the inclined truss-rods 5 and vertical rod 6. Thus the entire scale, multiplying-levers and all, may be supported above the floor of the building in which it is placed. The outer ends of the extension-levers $e'$, which levers extend entirely across the scale, are hung by loops $r$ and knife-edge bearings from the pipe-lever $f$, supported at its ends in the yokes $i$, which are attached to and form a part of the standards $h$. The pipe-lever $f$ also carries the arm $g$, attached to the weighing-beam $j$ by the usual connections.

The columns supporting the weighing-beam are indicated at $m$, and $n$ are check-rods attached to the yoke $d$ and to the platform $a$ to limit the swinging motion of the scale.

In Figs. 7 and 8 is shown a modified construction, in which $o\ o'$ are straight-line levers, which may be used instead of pipe-levers. One end is suspended from an arm on the yoke $d$. The extension-levers $e'$ are connected, respectively, thereto by the loops $p$, and the two levers come together in the center of the scale, where they are connected to the weighing-beam in a well-known manner.

Referring to Figs. 9 and 10, the former shows the details of the connection between the extension-levers $e'$ and $e$, and in these figures $q$ represents yokes carrying the knife-edges $z$, which yokes are attached to the extension-levers, and a loop $r$ surrounds the knife-edge pivots.

In Fig. 11 is shown in detail the yokes $d$ and $i$, with the connection at the forward end between the lever $e'$ and the pipe-lever $f$ and between the rear end of one of the main levers $c$ and the supporting-yoke $d$, this connection comprising the loop $y$, whose lower ends embrace the knife-edge on the lever $c$, said loop at its upper end hanging from the screw-eye $s$, as shown.

The yokes $d$ and stands $h$ are connected together in sets by means of the usual angle-irons.

This scale may be considered as being made up of units, each unit consisting of four main levers $c$, one extension-lever each of $e$ and $e'$, with the necessary yokes, stands, and bearings. The pipe-lever $f$ and weighing-beam $j$ are common to both units. Thus it will be seen that by lengthening the pipe $f$ other units may be added to the two shown in the drawings, so that the scale may have eight, twelve, sixteen, or any indefinite number of points of bearing or support, and by this construction the load is distributed over eight or more points of support on eight or more main levers, and at the same time a large free opening is left in the center of the scale, through which the hopper may protrude or through which various pipes may lead off from the hopper or tank without interfering with the scale itself.

Various minor modifications or changes in the construction of the various parts of the apparatus may be made without departing from the spirit of the invention.

Having thus described my invention, what I claim, and desire to secure by Letters Patent, is—

1. In a weighing-scale, the combination of a platform, and weighing-beam, and mechanism for supporting the platform comprising a series of units, each unit consisting of two sets of main levers, which levers are arranged in pairs upon opposite sides of the scale, each pair of main levers being supported at their rear ends from the scale-frame and at their adjacent free ends operatively engaging extension-levers, said extension-levers being arranged to coöperate with said main levers, one of said extension-levers being operatively connected at its rear end with one set of main levers and extending across the scale, with its free end operatively connected with the weighing-beam, and the other extension-lever at one end being operatively connected with the other set of said main levers and at its forward end connected with the first extension-lever at a point intermediate the ends of the latter, substantially as described.

2. In a weighing-scale, the combination of a platform and weighing-beam, of mechanism for supporting the platform, comprising a series of units, each unit including main levers, as $c$, arranged in pairs at opposite sides of the scale, the levers $c$ of each pair being supported at one end from the scale-frame, and with their free ends adjacent, extension-levers from which the adjacent free ends of said levers $c$ are hung, one of said extension-levers extending part way across the scale and supported from the other intermediate the ends thereof, while the other extends the full width of the scale, and a pipe-lever, to which the outer end of said long extension-lever is attached, and connections between the pipe-lever and the weighing-beam; substantially as described.

3. The herein-described scale, comprising the platform, the weighing-beam, the levers $c$ arranged in sets of two, upon opposite sides of the scale, the levers $c$ of each pair being supported at one end from the scale-frame and having their opposite free ends adjacent extension-levers $e, e'$, from which respectively the adjacent free ends of the levers $c$ are hung, one of said extension-levers $e$, being supported at one end from the other, the latter $e'$ being connected with the weighing-beam, and suitable yokes, standards, and bearings; substantially as described.

4. The herein-described scale, comprising the platform, the main levers as $c$, the bearings $b$ attached to the platform, and resting on knife-edges on the levers $c$, the yokes $d$, for supporting the main levers, said main levers being arranged in sets of two each, with their adjacent free ends supported by knife-edges and loops from the extension-levers $e$ or $e'$, stands $h, h'$, for respectively supporting the levers $e, e'$, and suitable connections between the lever $e'$, and the weighing-beam; substantially as described.

5. The herein-described scale, comprising the platform, the main levers as $c$, the bearings $b$ attached to the platform and resting on knife-edges on the levers $c$, the yokes $f$, for supporting the main levers, said main levers being arranged in sets of two each with their adjacent free ends supported by knife-edges and loops from the extension-levers $e$ or $e'$, stands $h, h'$, for respectively supporting the levers $e, e'$, a pipe-lever $f$ to which the extension-lever $e'$ is attached, connections between the pipe-lever, and the weighing-beam, and a yoke $i$, for supporting the pipe-lever, said yoke being attached to the stand $h$; substantially as described.

6. The herein-described hopper-scale, comprising the platform, the hopper supported thereon, the levers $c$, and extension-levers, standards supporting the same, irons supporting the standards, the levers *c* being supported from the extension-levers between two opposite sets of levers, one of which extends entirely across the scale and the other of which is supported at one end therefrom whereby the load is evenly distributed upon opposite sides of the scale, the parts being all arranged above the floor, and a free open space between the sets of levers and extension-levers being left; substantially as described.

7. The herein-described hopper weighing-scale, comprising a platform and weighing-beam, with suitable stands and supports for the levers, two main levers *c* with their free ends adjacent, supported at each corner of the scale, two extension-levers *e'* extending entirely across the scale and each supported at one end from two of said main levers, and at the opposite end operatively connected with the weighing-beam through a common pipe-lever or other transmitting device, and two extension-levers *e*, parallel with the first and supporting at one end the adjacent free ends of the other sets of main levers, and at the opposite end supported from the extension-levers *e'*, said extension-levers being arranged adjacent opposite sides of the scale, whereby a free open space between the sets of levers and extension-levers for the reception of a hopper, is provided; substantially as described.

In testimony whereof I affix my signature in presence of two witnesses.

WILLIS H. SARGENT.

Witnesses:
JUNIUS H. BRAND,
FRANK O. FRENCH.